United States Patent
Yokomakura et al.

(10) Patent No.: US 11,051,290 B2
(45) Date of Patent: Jun. 29, 2021

(54) BASE STATION APPARATUS, TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignees: SHARP KABUSHIKI KAISHA, Osaka (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/470,990

(22) PCT Filed: Dec. 1, 2017

(86) PCT No.: PCT/JP2017/043283
§ 371 (c)(1),
(2) Date: Jun. 19, 2019

(87) PCT Pub. No.: WO2018/116788
PCT Pub. Date: Jun. 28, 2018

(65) Prior Publication Data
US 2019/0380114 A1     Dec. 12, 2019

(30) Foreign Application Priority Data
Dec. 20, 2016   (JP) .............................. JP2016-246462

(51) Int. Cl.
*H04J 3/16*      (2006.01)
*H04W 72/04*     (2009.01)
(Continued)

(52) U.S. Cl.
CPC ........ *H04W 72/042* (2013.01); *H04B 17/309* (2015.01); *H04L 5/0048* (2013.01); *H04W 24/10* (2013.01)

(58) Field of Classification Search
None
See application file for complete search history.

(56) References Cited

U.S. PATENT DOCUMENTS

2014/0044040 A1 * 2/2014 Chen .................... H04J 11/005
370/328
2016/0105817 A1   4/2016 Frenne et al.
(Continued)

FOREIGN PATENT DOCUMENTS

EP    3481109 A1   5/2019
EP    3641424 A1   4/2020
(Continued)

OTHER PUBLICATIONS

Official Communication issued in International Patent Application No. PCT/JP2017/043283, dated Feb. 20, 2018.
(Continued)

*Primary Examiner* — Kwang B Yao
*Assistant Examiner* — Juvena W Loo
(74) *Attorney, Agent, or Firm* — Finnegan, Henderson, Farabow, Garrett & Dunner LLP

(57) ABSTRACT

Provided is a terminal apparatus configured to communicate with a base station apparatus. The terminal apparatus includes: a higher layer processing unit configured to receive first information including a setting for semi-persistent channel state information-reference signal (CSI-RS) for measuring channel state information; a medium access control (MAC) layer configured to receive second information including information for activating the semi-persistent CSI-RS; and a receiver configured to receive a physical downlink
(Continued)

shared channel (PDSCH). In the terminal apparatus, in a case where the semi-persistent CSI-RS is activated, a resource element to be used for the activated reference signal is not to be used as a resource element for the physical downlink shared channel.

4 Claims, 7 Drawing Sheets

(51) Int. Cl.
*H04B 17/309* (2015.01)
*H04L 5/00* (2006.01)
*H04W 24/10* (2009.01)

(56) References Cited

U.S. PATENT DOCUMENTS

| | | | | |
|---|---|---|---|---|
| 2017/0195031 | A1* | 7/2017 | Onggosanusi | H04L 5/0048 |
| 2017/0245165 | A1* | 8/2017 | Onggosanusi | H04L 5/0057 |
| 2018/0102817 | A1* | 4/2018 | Park | H04B 7/06 |
| 2018/0375560 | A1* | 12/2018 | Wei | H04B 7/0486 |
| 2019/0089436 | A1* | 3/2019 | Wei | H04L 5/0082 |
| 2020/0022132 | A1* | 1/2020 | Grant | H04L 5/0053 |

FOREIGN PATENT DOCUMENTS

| | | |
|---|---|---|
| JP | 2013-527644 A | 6/2013 |
| JP | 2016-516339 A | 6/2016 |
| WO | 2018034924 A1 | 2/2018 |

OTHER PUBLICATIONS

NTT DOCOMO, "Revision on SI: Study on New Radio Access Technology", 3GPP TSG RAN Meeting #72, RP-161214, Jun. 13-16, 2016, 8 pages.

Nokia et al., "Basic principles for the 5G New Radio access technology", 3GPP TSG-RAN WG1 #84bis, R1-162883, Apr. 11-15, 2016, 6 pages.

Intel Corporation, "Overview of antenna technology for new radio interface", 3GPP TSG-RAN WG1 #84bis, R1-162380, Apr. 11-15, 2016, pp. 1-3.

Ericsson, "Overview of NR", TSG-RAN WG1 #84bis, R1-163215, Apr. 11-15, 2016, 2 pages.

CATT, "Remaining issues on aperiodic CSI-RS for FD-MIMO", TSG-RAN WG1 #86bis, R1-1608733, Oct. 10-14, 2016, 3 pages.

KDDI, "23.501: Introducing congestion and overload control for AMF- and SMF-", 3GPP Draft; S2-170299, 3rd Generation Partnership Project (3GPP), Mobile Competence Centre ; 650, Route Des Lucioles ; F-06921 Sophia-Antipolis Cedex ; France, vol. SA WG2, no. Spokane, USA; Jan. 16, 2017-Jan. 20, 2017, Jan. 16, 2017 (Jan. 16, 2017), XP051216488, Retrieved from the Internet : http://www.3gpp.org.

Huawei et al, "UE Slice Association/Overload control Procedure", 3GPP Draft; S2-162981 Was S2-162605_UE Slice Association_Overload Control Procedure_V1.1, 3rd Generation Partnership Project (3GPP), Mobile Competence Centre ; 650, Route Des Lucioles; F-06921 Sophia, vol. SA WG2, no. Nanjing, China; May 23, 2016-May 27, 2016, May 27, 2016 (May 27, 2016), XP051116481, Retrieved from the Internet : URL:http://www.3gpp.org/ftp/tsg_sa/WG2_Arch/TSGS2_115_Nanjing_China/Docs/, [retrieved on May 27, 2016].

Ericsson, "Radio interlace implications of network slicing", 3GPP Draft; R2-1700386 Radio in Interface Implications of Network Slicing, 3rd Generation Partnership Project (3GPP), Mobile Competence Centre ; 650, Route Des Lucioles ; F-06921 Sophia-Antipolis Cedex ;, vol. RAN WG2, no. Spokane USA; Jan. 17, 2017-Jan. 19, 2017, Jan. 17, 2017 (Jan. 17, 2017), XP051210965, Retrieved from the Internet : http://www/3gpp.org.

LG Electronics, "Congestion control for session management (SM)", 3GPP Draft; S2-164548_Congestion Control for Session Management, 3rd Generation Partnership Project (3GPP), Mobile Competence Centre ; 650, Route Des Lucioles ; F-06921 Sophia-Antipolis Cedex ; France, vol. SA WG2, no. Sanya, China; Aug. 29, 2016-Sep. 2, 2016, Aug. 27, 2016 (Aug. 27, 2016), XP051130522 Retrieved from the Internet : http://www/3gpp.org.

European Patent Office, "The Extended European Search Report" of Application No. 17883741.5-1205 / 3562230 PCT/JP2017043283, dated Jun. 19, 2020 (4 pages).

Japan Patent Office, "International Search Report" of PCT/JP2017/043283 (2 pages).

European Patent Office, "Supplementary European Search Report" of Application No. EP 17 88 3741, dated Jun. 8, 2020 (3 pages).

NTT DOCOMO, "Reference Signal Design for NR Beam Management," 3GPP TSG-RAN WG1 #87, R1-1612727, Oct. 10-14, 2016 (5 pages).

Qualcomm Incorporated, "Enhancements on Beamformed CSI-RS for eFD-MIMO," 3GPP TSG-RAN WG1#85, R1-164428, May 23-27, 2016 (5 pages).

* cited by examiner

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority based on JP 2016-246462 filed on Dec. 20, 2016 and submitted to Japan Patent Office, the contents of which are incorporated herein by reference.

BACKGROUND ART

Currently, the Third Generation Partnership Project (3GPP) has performed technical studies and standard formulation of Long Term Evolution (LTE)-Advanced Pro and New Radio technology (NR) as radio access schemes and wireless network technologies for fifth generation cellular systems (NPL 1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

The NR studies the Massive Multiple-Input Multiple-Output (MIMO) technology that uses a large number of antenna elements at high frequencies to secure coverage with a beamforming gain (NPL 2, NPL 3, and NPL 4).

CITATION LIST

Non Patent Literature

NPL 1: RP-161214, NTT DOCOMO, "Revision of SI: Study on New Radio Access Technology", June 2016

NPL 2: R1-162883, PDNokia, Alcatel-Lucent Shanghai Bell, "Basic principles for the 5G New Radio access technology", April 2016

NPL 3: R1-162380, Intel Corporation, "Overview of antenna technology for new radio interface", April 2016

NPL 4: R1-163215, Ericsson, "Overview of NR", April 2016

SUMMARY OF INVENTION

Technical Problem

An object of the present invention is to provide a terminal apparatus, a base station apparatus, a communication method, and an integrated circuit, where the base station apparatus and the terminal apparatus are efficient in the above-mentioned radio communication systems.

Solution to Problem (1) To accomplish the object described above, aspects of the present invention are contrived to provide the following measures. A terminal apparatus according to one aspect of the present invention is a terminal apparatus for communicating with a base station apparatus. The terminal apparatus includes a higher layer processing unit configured to receive first information including a setting for semi-persistent channel state information-reference signal (CSI-RS) for measuring channel state information, a medium access control (MAC) layer configured to receive second information including information for activating the semi-persistent CSI-RS, and a reception unit configured to receive a physical downlink shared channel (PDSCH). In the terminal apparatus, in a case where the semi-persistent CSI-RS is activated, a resource element to be used for the reference signal activated is not to be used as a resource element for the physical downlink shared channel.

(2) A base station apparatus according to one aspect of the present invention is a base station apparatus for communicating with a terminal apparatus. The base station apparatus includes a higher layer processing unit configured to transmit first information including a setting for semi-persistent channel state information-reference signal (CSI-RS) for measuring channel state information, a medium access control (MAC) layer configured to transmit second information including information for activating the semi-persistent CSI-RS, and a transmission unit configured to transmit a physical downlink shared channel (PDSCH). In the base station apparatus, in a case where the semi-persistent CSI-RS is activated, a resource element to be used for the semi-persistent CSI-RS activated is not to be used as a resource element for the physical downlink shared channel.

(3) A communication method according to one aspect of the present invention is a communication method for a terminal apparatus for communicating with a base station apparatus. The communication method includes the steps of receiving first information including a setting for semi-persistent channel state information-reference signal (CSI-RS) for measuring channel state information, receiving second information including information for activating the semi-persistent CSI-RS, and receiving a physical downlink shared channel (PDSCH). In the communication method, in a case where the semi-persistent CSI-RS is activated, a resource element to be used for the reference signal activated is not to be used as a resource element for the physical downlink shared channel.

(4) A communication method according to one aspect of the present invention is a communication method for a base station apparatus for communicating with a terminal apparatus. The communication method includes the steps of transmitting first information including a setting for semi-persistent channel state information-reference signal (CSI-RS) for measuring channel state information, transmitting second information including information for activating the semi-persistent CSI-RS, and transmitting a physical downlink shared channel (PDSCH). In the communication method, in a case where the semi-persistent CSI-RS is activated, a resource element to be used for the reference signal activated is not to be used as a resource element for the physical downlink shared channel.

(5) An integrated circuit according to one aspect of the present invention is an integrated circuit to be mounted in a terminal apparatus for communicating with a base station apparatus. The integrated circuit includes a receiver configured to receive first information including a setting for semi-persistent channel state information-reference signal (CSI-RS) for measuring channel state information, receive second information including information for activating the semi-persistent CSI-RS, and receive a physical downlink shared channel (PDSCH). In the integrated circuit, in a case where the semi-persistent CSI-RS is activated, a resource element to be used for the reference signal activated is not to be used as a resource element for the physical downlink shared channel.

(6) An integrated circuit according to one aspect of the present invention is an integrated circuit to be mounted on a base station apparatus for communicating with a terminal apparatus. The integrated circuit includes a transmitter configured to transmit first information including a setting for semi-persistent channel state information-reference signal (CSI-RS) for measuring channel state information, transmit second information including information for activating the semi-persistent CSI-RS, and transmit a physical downlink shared channel (PDSCH). In the integrated circuit, in a case where the semi-persistent CSI-RS is activated, a resource element to be used for the reference signal activated is not to be used as a resource element for the physical downlink shared channel.

Advantageous Effects of Invention

According to one aspect of the present invention, a base station apparatus and a terminal apparatus efficiently communicate with each other.

DESCRIPTION OF EMBODIMENTS

Embodiments of the present invention will be described below.

Figure 1:
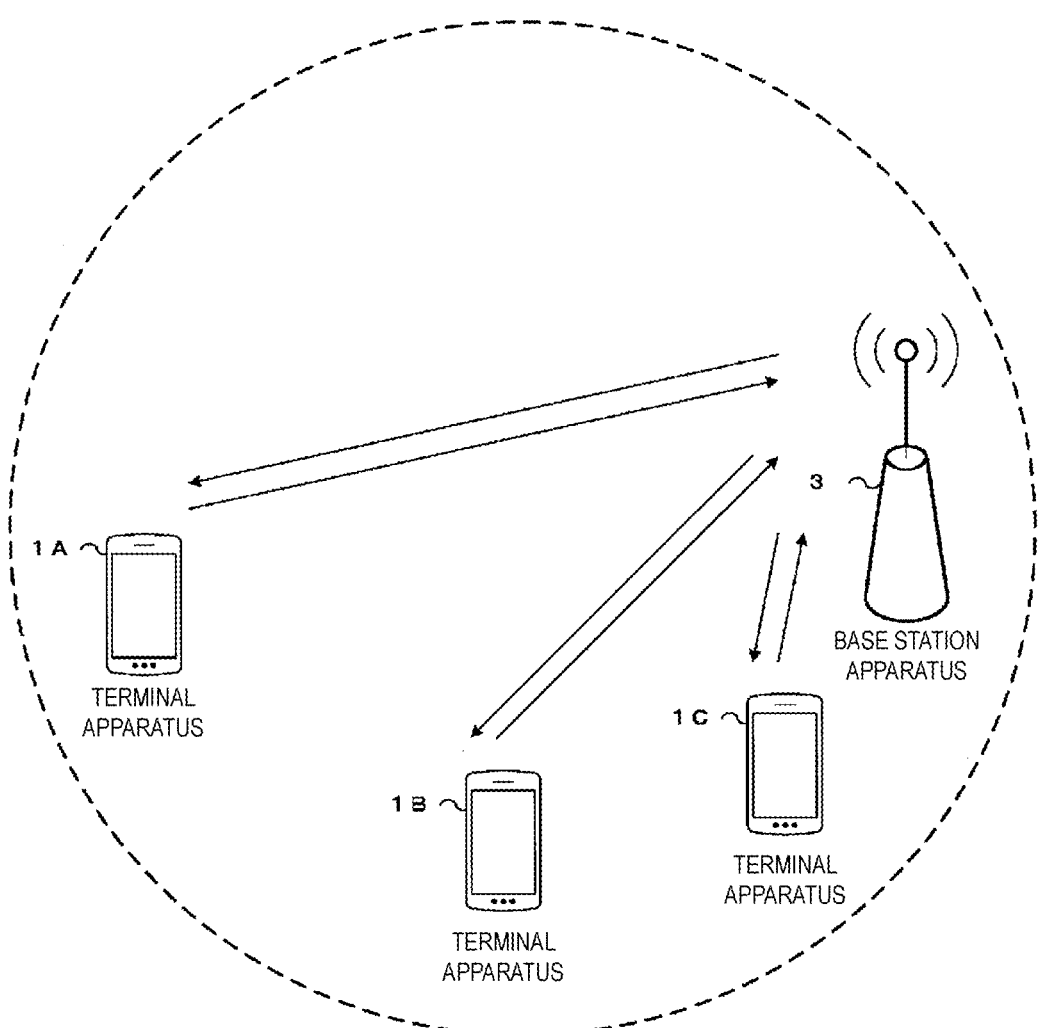
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), or a gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in one aspect of the present invention.

Alternatively, in FIG. 1, in the radio communication between the terminal apparatus 1 and the base station apparatus 3, the CP does not have to be used, or the above-described transmission scheme with zero padding may be used instead of the CP. Moreover, the CP or zero passing may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Control CHannel (PCCH)
Physical Shared CHannel (PSCH)

The PBCH is used to broadcast important information blocks, such as Master Information Block (MIB), Essential Information Block (EIB), and Broadcast Channel (BCH), which include essential system information needed by the terminal apparatus 1.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK indicated may be a HARQ-ACK for downlink data (Transport block, Medium Access Control Protocol Data Unit (MAC PDU), or Downlink-Shared Channel (DL-SCH)).

The PCCH is used to transmit downlink control information (DCI) in a case of downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit System Information (SI), Random Access Response (PAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive Radio Resource Control (RRC) signaling (also referred to as RRC message or RRC information) in the RRC layer. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE capabilities in the uplink.

Although the same designations PCCH and PSCH are commonly used for the downlink and the uplink, different channels may be defined for the downlink and for the uplink.

For example, the shared channel of the downlink may be referred to as a Physical Downlink Shared CHannel (PDSCH). In addition, the shared channel of the uplink may be referred to as a Physical Uplink Shared CHannel (PUSCH). In addition, the control channel of the downlink may be referred to as a Physical Downlink Control CHannel (PDCCH). The control channel of the uplink may be referred to as a Physical Uplink Control CHannel (PUCCH).

In FIG. 1, the following downlink physical signals are used for downlink radio communication. Here, the downlink physical signals are not used to transmit the information output from the higher layers but is used by the physical layer.

Synchronization Signal (SS)

Reference Signal (RS)

The Synchronization Signal may include a Primary Synchronization Signal (PSS) and a Secondary Synchronization Signal (SSS). Cells ID may be detected using the PSS and the SSS.

The Synchronization Signal is used for the terminal apparatus 1 to take synchronization in the frequency domain and the time domain in the downlink. The Synchronization Signal may be used by the terminal apparatus 1 for precoding by the base station apparatus 3, for precoding in beamforming, or beam selection.

The Reference Signal is used by the terminal apparatus 1 to perform channel compensation on a physical channel. The Reference Signal may be used by the terminal apparatus 1 to calculate the downlink CSI. In addition, the Reference Signal may be used for a numerology for a radio parameter or subcarrier spacing, or may be used for Fine synchronization sufficient to achieve FFT window synchronization.

In the present embodiment, any one or more of the following downlink Reference Signals are used.

Demodulation Reference Signal (DMRS)

Channel State Information Reference Signal (CSI-RS)

Phase Tracking Reference Signal (PTRS)

Mobility Reference Signal (MRS)

The DMRS is used to demodulate modulated signals. Note that two types of Reference Signals may be defined: Reference Signals for demodulating PBCH; and Reference Signals for demodulating PSCH. In addition, Reference Signals of both types may be referred to as DMRS. The CSI-RS is used for the measurement of the Channel State Information (CSI) and for the beam management. The PTRS is used to track the phase when the terminal apparatus moves, or in the like events. The MRS may be used to measure the reception quality of the signals from multiple base station apparatuses for handovers. In addition, Reference Signals for compensating phase noise may also be defined as Reference Signals.

The downlink physical channels and/or the downlink physical signals are collectively referred to as downlink signals. The uplink physical channels and/or the uplink physical signals are collectively referred to as uplink signals. The downlink physical channels and/or the uplink physical channels are collectively referred to as physical channels. The downlink physical signals and/or the uplink physical signals are collectively referred to as physical signals.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (MAC PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Reference Signals may be used in the Radio Resource Measurement (RRM). Reference signals may also be used for the beam management.

The beam management may be a procedure performed by the base station apparatus 3 and/or the terminal apparatus 1 for acquiring beam gain by matching the direction of the analog and/or digital beam in the transmission apparatus (the base station apparatus 3 in downlink cases; the terminal apparatus 1 in uplink cases) with the direction of the analog and/or digital beam in the reception apparatus (the terminal apparatus 1 in downlink cases; the base station apparatus 3 in uplink cases).

Note that the beam management may include the following procedures.
  Beam selection
  Beam refinement
  Beam recovery For example, the beam selection may be a procedure for selecting a beam in the communication between the base station apparatus 3 and the terminal apparatus 1. In addition, the beam refinement may be a procedure for selecting a beam with a higher gain, or for changing the beam between the optimal base station apparatus 3 and the terminal apparatus 1, which may be needed when the terminal apparatus 1 moves. The beam recovery may be a procedure for re-selecting a beam when the quality of the communication link is degraded by a blockage caused when an obstruction or a person crosses the communication path between the base station apparatus 3 and the terminal apparatus 1.

For example, the CSI-RS may be used in selecting the transmit beam of the base station apparatus 3 in the terminal apparatus 1, or a Quasi Co-Location (QCL) assumption may be used for the same purpose.

If the Long Term Property of a channel where a certain symbol in one antenna port is carried can be inferred from the channel where the certain symbol in the other antenna port is carried, the two antenna ports are considered to be in the QCLs. The Long Term Property of the channel includes one or more of the delay spread, the Doppler spread, the Doppler shift, the average gain, and the average delay. For example, when antenna port 1 and antenna port 2 are in the QCL for an average delay, it is meant that the reception timing of antenna port 2 may be inferred from the reception timing of antenna port 1.

The QCL may also be extended to the beam management. To this end, the spatially extended QCL may be newly defined. For example, a Long term property of the channel in the spatial QCL assumption may be: the Angle of Arrival (AoA) (such as the Zenith angle of Arrival (ZoA), etc.) in the radio link or channel and/or its Angle of Spread (such as the Angle Spread of Arrival (ASA) and Zenith angle Spread of Arrival (ZSA)); or the delivery angle (such as the AoD, ZoD, etc.) and/or its Angle Spread, (such as Angle Spread of Departure (ASD), Zenith angle Spread of Departure (ZSS)); or the Spatial Correlation.

By use of this method, the operations of the base station apparatus 3 and the terminal apparatus 1 equivalent to the beam management may be defined, as the beam management, based on the spatial QCL assumption and the radio resources (time and/or frequency).

The subframe will now be described. The subframe in the embodiment may also be referred to as a resource unit, a radio frame, a time period, or a time interval.

Figure 2:
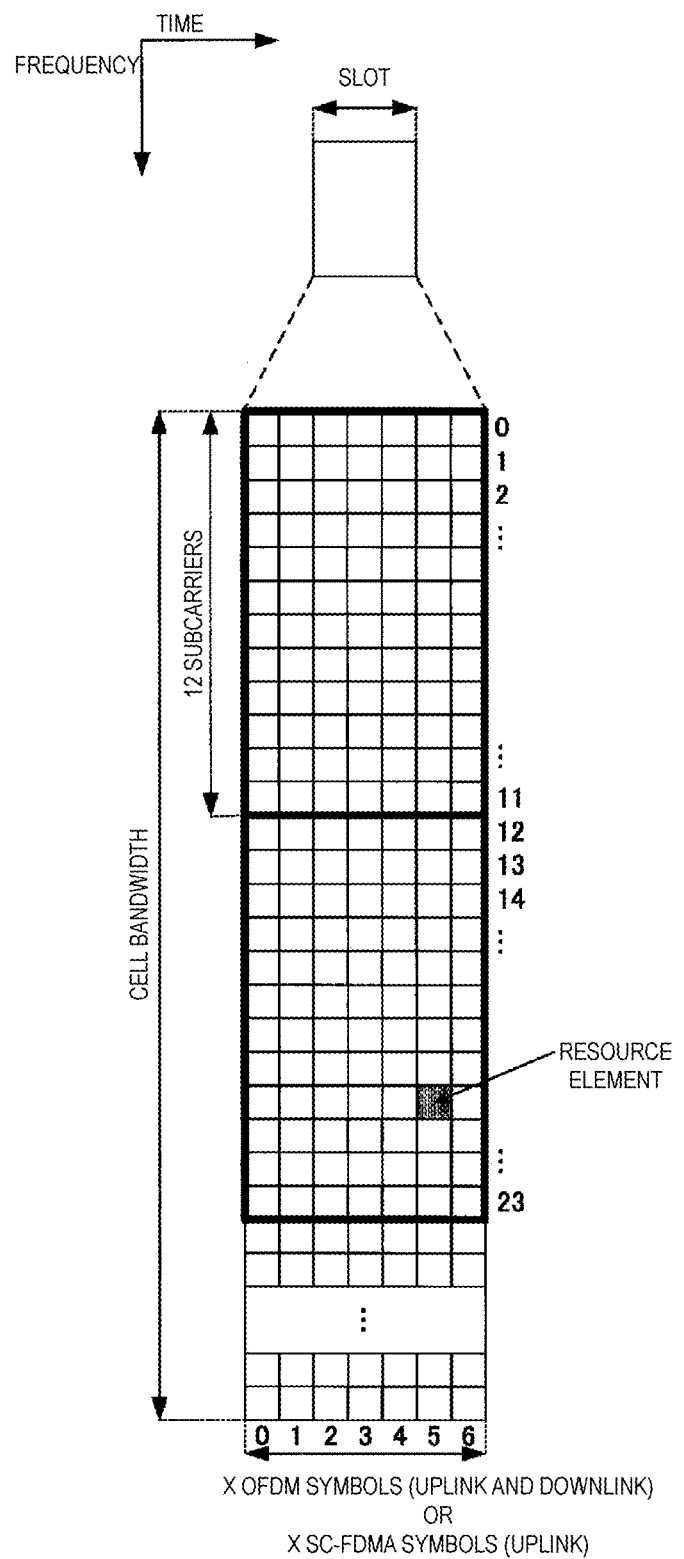
FIG. 2 is a diagram illustrating an exemplar schematic configuration of a downlink slot according to the present embodiment.

FIG. 2 is a diagram illustrating an exemplar schematic configuration of a downlink slot according to a first embodiment of the present invention. Each of the radio frames is 10 ms in length. Each of the radio frames includes 10 subframes and X slots. In other words, the length of one subframe is 1 ms. Each of the slots has a duration defined by subcarrier spacing. For example, in a case of a 15-kHz subcarrier spacing of OFDM symbols and in addition, in a case of a Normal Cyclic Prefix (NCP), X=7 or X=14. The duration of each slot is 0.5 ms for the case of X=7, and is 1 ms for the case of X=14. In addition, in a case where the subcarrier spacing is 60 kHz, X=7 or X=14. The duration of each slot is 0.125 ms for the case of X=7, and is 0.25 ms for the case of X=14. FIG. 2 illustrates the case of X=7 as an example.

Note that in the case of X=14, the same extension is possible. The uplink slot may be defined similarly. Alternatively, the downlink slot and the uplink slot may be defined separately.

The signal or the physical channel transmitted in each of the slots may be expressed by a resource grid. The resource grid is defined by a plurality of subcarriers and a plurality of OFDM symbols. The number of subcarriers included in one slot depends on the bandwidths of the downlink and the uplink of the cell. Each element within the resource grid is referred to as a resource element. The resource element may be identified by a subcarrier number and an OFDM symbol number.

A resource block is used to express the mapping of a certain physical downlink channel (such as the PDSCH) or a certain physical uplink channel (such as the PUSCH) to resource elements. For the resource block, a virtual resource block and a physical resource block are defined. A certain physical uplink channel is mapped firstly to a virtual resource block. Then, the virtual resource block is mapped to the physical resource block. In a case where the number X of OFDM symbols included in the slot is seven (i.e., X=7) and in addition, in a case of the NCP, one physical resource block is defined by seven consecutive OFDM symbols in the time domain and by twelve consecutive subcarriers in the frequency domain. Hence, one physical resource block includes (7×12) resource elements. In the case of the Extended CP (ECP), one physical resource block is defined, for example, by six consecutive OFDM symbols in the time domain and by twelve consecutive subcarriers in the frequency domain. Hence, one physical resource block includes (6×12) resource elements. Note that one physical resource block corresponds to one slot in the time domain, and that in the case of a subcarrier spacing of 15 kHz, one physical resource block corresponds to 180 kHz (720 kHz in the case of a 60-kHz subcarrier spacing) in the frequency domain. Physical resource blocks are numbered from 0 in the frequency domain.

Figure 3:
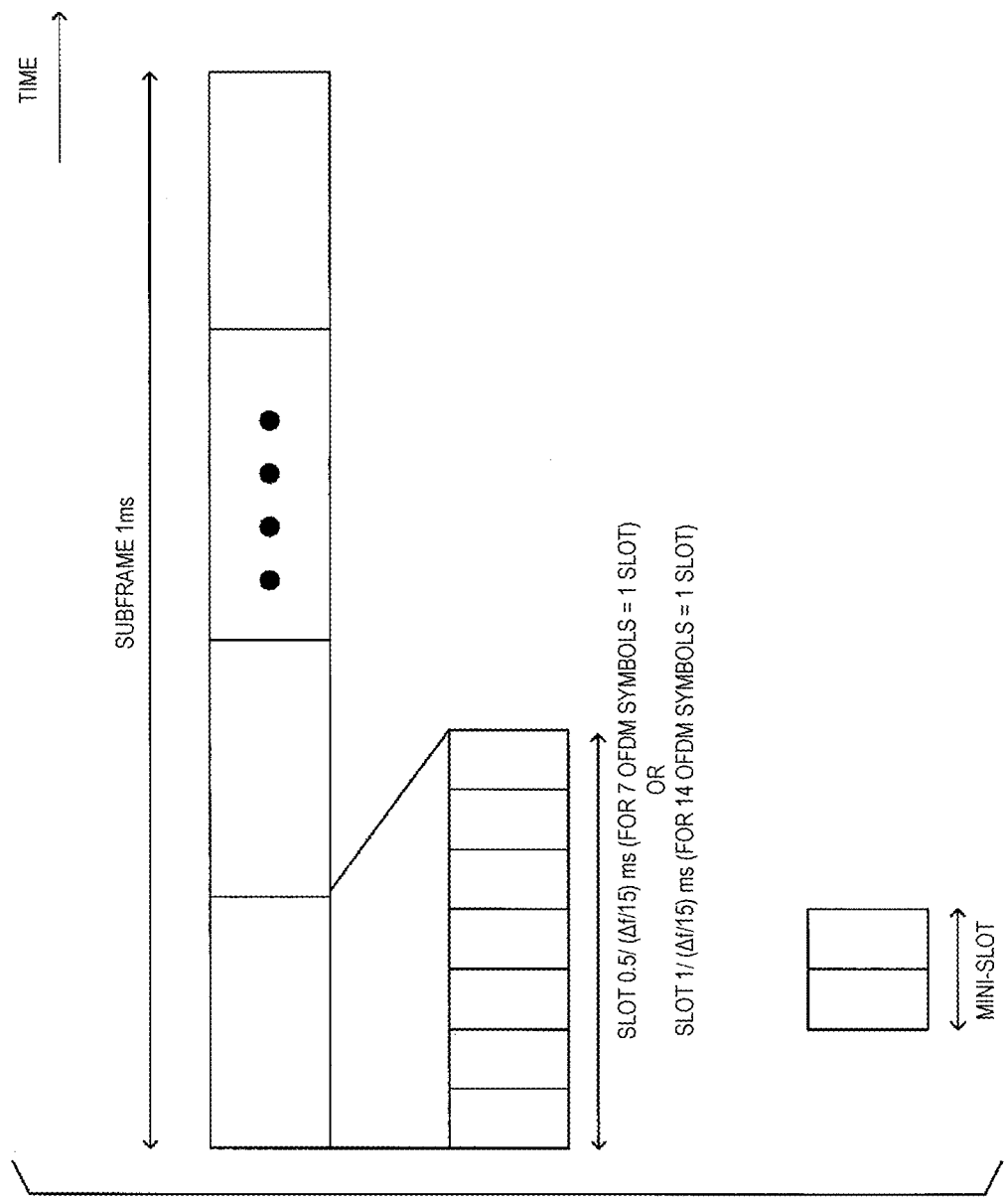
FIG. 3 is a diagram illustrating relationships among a subframe, a slot, and a mini-slot in a time domain.

The subframe, the slot, and the mini-slot will now be described. FIG. 3 is a diagram illustrating the relationships among a subframe, a slot, and a mini-slot in the time domain. As illustrated in FIG. 3, three time units are defined. The subframe has a duration of 1 ms regardless of the subcarrier spacing, the OFDM symbol number included in the slot is 7 or 14, and the slot length varies depending on the subcarrier spacing. In a case where the subcarrier spacing is 15 kHz, 14 OFDM symbols are included in one subframe. Thus, supposing that the subcarrier interval is $\Delta f$ (kHz), the slot length may be defined as $0.5/(\Delta f/15)$ ms in the case where 7 OFDM symbols are included in one slot. Note that the $\Delta f$ may be defined by the subcarrier spacing (kHz). In addition, The slot length may be defined as $1/(\Delta f/15)$ ms in the case where 7 OFDM symbols are included in one slot. Note that the $\Delta f$ may be defined by the subcarrier spacing (kHz). In addition, the slot length may be defined as $X/14/(\Delta f/15)$ ms, where X is the OFDM symbol number included in the slot.

The mini-slot (which may be referred to as a sub-slot) is a time unit including OFDM symbols that are fewer than the OFDM symbols included in the slot. FIG. 3 illustrates, by way of example, a case where the mini-slot includes 2 OFDM symbols. The OFDM symbols in the mini-slot may match the timing of the OFDM symbols included in the slot. Note that the smallest unit of scheduling may be a slot or a mini-slot.

Figure 4:
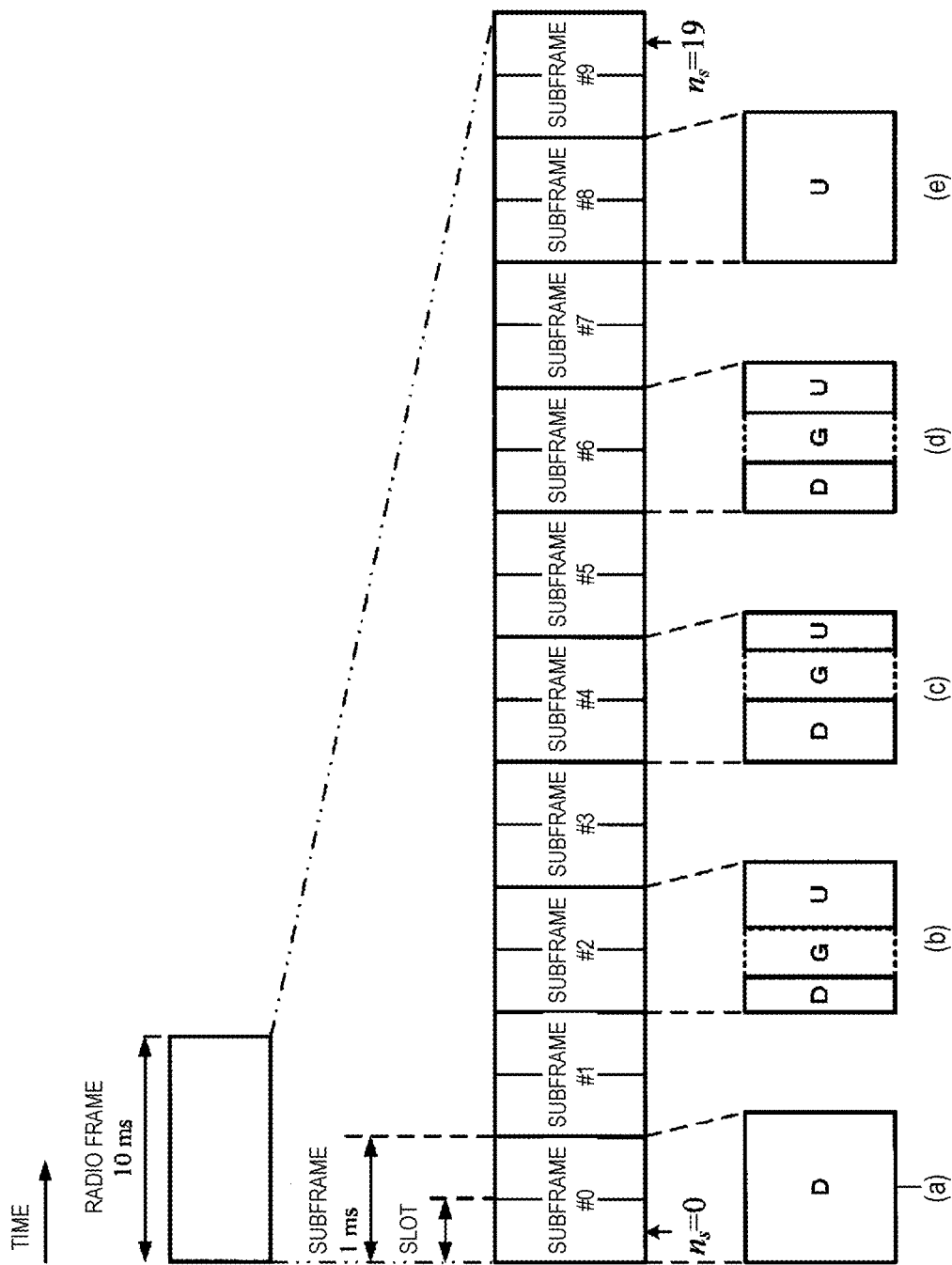
FIG. 4 is a diagram illustrating some exemplar slots or subframes.

FIG. 4 is a diagram illustrating some exemplar slots or subframes. The illustrated example is a case where the slot length is 0.5 ms with the subcarrier spacing being 15 kHz. In FIG. 4, the symbol D represents the downlink, and the symbol U represents the uplink. As illustrated in FIG. 4, in a certain time period (for example, the minimum time period that has to be allocated to an UE in the system), the subframe may include one or more of the followings:

Downlink part (duration);
Gap; and
Uplink part (duration).

Part (a) of FIG. 4 illustrates an example in which the entire subframe is used for downlink transmission during a certain time period (for example, a minimum time resource unit that can be allocated to an UE; the minimum time resource unit may be referred to as a time unit, or a plurality of the minimum time resource units bundled together may be referred to as a time unit). Part (b) of FIG. 4 illustrates an example in which an uplink is scheduled via, for example, a PCCH by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may be constituted of multiple OFDM symbols as is the case with LTE.

Figure 5:
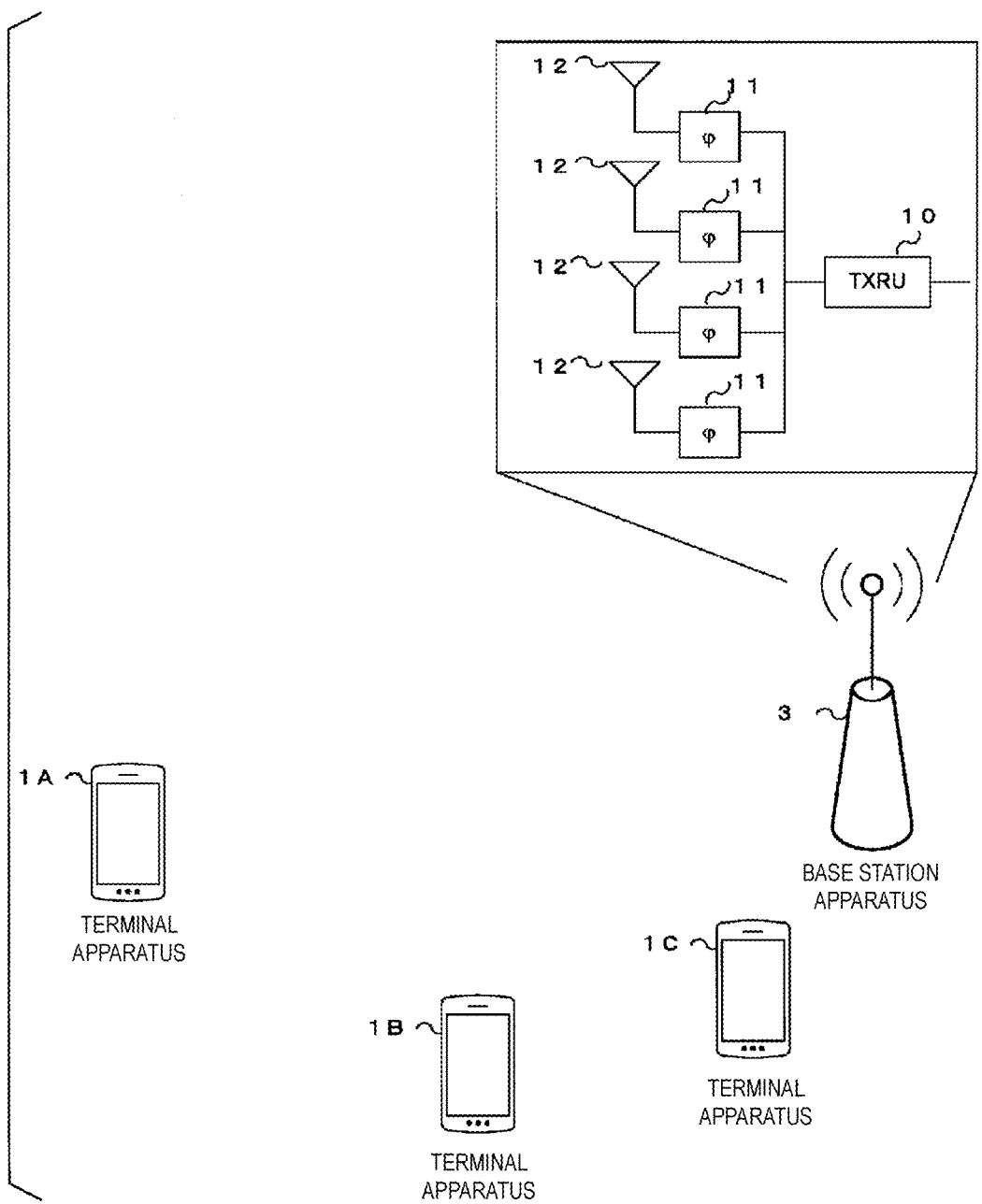
FIG. 5 is a diagram illustrating exemplar beam forming.

FIG. 5 is a diagram illustrating exemplar beam forming. Multiple antenna elements are connected to one Transceiver unit (TXRU) 10. Phase shifters 11 are individually provided for the multiple antenna elements to control the phases. The transmit signal is transmitted from antenna elements 12, allowing the beam to be directed in any direction relative to the transmit signal. Typically, the TXRU may be defined as an antenna port, and only the antenna port may be defined in the terminal apparatus 1. By controlling the phase shifters 11, the base station apparatus 3 can direct directionality in any direction, and thus, the base station apparatus 3 can communicate with the terminal apparatus 1 by use of a beam having a high gain.

The terminal apparatus 3 performs measurements in the RRC layer to measure the quality of the radio link (e.g., RRM measurements). The terminal apparatus 3 performs CSI measurements on the physical layer. The terminal apparatus 3 transmits, in the RRC layer, the report of the measurement performed in the RRC layer, and transmits, in the physical layer, the report of the CSI in the physical layer.

In the case of a downlink, the CSI report reports, to the base station apparatus 3, the CSI measured by the terminal apparatus 1. To this end, the base station apparatus 3 configures one or more CSI reporting settings for the terminal apparatus 1. The CSI reporting settings may include the following settings.

Operation in the time direction (transmission method)
Granularity in frequency domain
CSI Type The operation in the time direction may indicate a method of transmitting reference signals, such as an aperiodic method (which may be referred also to as the one-shot method), a semi-persistent method, and a periodic method.

The granularity in the frequency domain may be, for example, the granularity used in the calculation of the PMI and/or the CQI. For example, the granularity may indicate that one wide band PMI and/or one wide band CQI is provided for all the resource blocks included in the measured bandwidth. For example, the granularity may indicate the number of resource blocks (the number of resource blocks in the partial band and/or in the resource block group) for which the sub-band and/or partial band (i.e., a band narrower than the band to be measured) PMI and/or the sub-band and/or partial band CQI.

The CSI type may indicate the type of CSI, such as, which one or more of the CQI, PMI, RI, and CRI to be reported as the CSI to be reported. In addition, as the CSI type may indicate which type of CSI to be fed back: the CSI (type 1) including PMI represented by a codebook; or an extended CSI (type 2) such as an analog feedback or a more granular codebook and/or a channel matrix and/or a covariance matrix of channels.

The RS (e.g., CSI-RS) is used to assume the reference signal to measure CSI. To this end, the base station apparatus 3 sets one or more RS settings for the terminal apparatus 1. The RS settings may include the following setting items:

Operation in the time direction (transmission method)
Resource(s)
Reference signal type The operation in the time direction may indicate a method of transmitting reference signals, such as an aperiodic method, a semi-persistent method, and a periodic method.

The resource may indicate a resource element and/or an OFDM symbol mapped at time and/or frequency. In addition, in the case of a semi-persistent or periodic transmission, a transmission interval (e.g., in milliseconds, in numbers of slots, in numbers of OFDM symbols, or the like) may be indicated. Note that a CSI-RS resource may be indicated by an index (or identity) in which such kinds of information is mapped.

Note that in any of the periodic, the semi-persistent, or the periodic method, the period and the subframe offset and/or the slot offset of the reference signal to be potentially transmitted may be included in an item within the RS settings described above.

The reference signal type may indicate, for example, whether a reference signal other than the CSI-RS (e.g., DMRS) is to be used as a reference signal for the CSI measurement. Needless to say, in a case where the CSI-RS is the only signal that can be used as the reference signal for the CSI measurement, this setting does not have to be included.

In the CSI measurement, the terminal apparatus 1 is used to measure the CSI. To this end, the base station apparatus 3 sets one or more CSI measurement settings for the terminal apparatus 1. The CSI measurement settings may include the following setting items:

One CSI report setting (one setting or an index indicating that one setting among one or more CSI reporting settings);

One RS setting (one setting or an index indicating that one setting among one or more RS settings); and Reference transmission mode The above-mentioned one CSI report setting may indicate, in a particular CSI measurement setting, a setting for reporting the CSI measured by use of the particular CSI measurement setting, or may indicate an index indicating the CSI report setting.

The above-mentioned one RS setting may indicate, in a particular CSI setting, a reference signal setting to be used for the particular CSI measurement, or may indicate an index indicating the reference signal setting.

Alternatively, the CSI report setting may be a setting relating, with an index of the one CSI report setting, the index of the CSI report setting and the index of the RS setting included in the CSI report setting.

The above-mentioned transmission mode may indicate, in a particular CSI measurement setting, the transmission mode and/or MIMO mode to be assumed for the CSI measurement. For example, the transmission mode may be a wireless transmission mode such as an OFDM mode and/or a DFT-S-OFDM mode. The MIMO mode may be a multi-antenna transmission mode, such as transmission diversity, closed loop MIMO, open loop MIMO, and semi-open loop MIMO. Alternatively, the transmission mode may be a transmission mode that refers to only one of these mentioned above. Still alternatively, the transmission mode may be a reference transmission mode formed by combining some of these mentioned above.

A CSI process for measuring the CSI may be configured in the terminal apparatus 1. One CSI process may be associated with one RS setting. One CSI process may also be associated with one CSI report setting.

As described above, in a case where, for a particular RS setting, the reference signal is activated in the MAC layer, the base station apparatus 3 transmits a reference signal based on the RS setting, and the terminal apparatus 1 recognizes (assumes) that a reference signal based on the RS setting and having been activated is transmitted. In a period in which the reference signal is activated, the terminal apparatus 1 receives the reference signal for the time and frequency resources of the reference signal configured by the RS setting.

Assume that, for example, for the CSI-RS resource included in the RS setting, a cycle of 5 ms, a subframe offset (or a slot offset) of 0, and the time and frequency resources for which the CSI-RS is mapped in the fourth subcarrier in the resource block of the sixth OFDM symbol in each subframe are set.

In this case, the potential resources in which the CSI-RS is mapped based on the radio frame number are subframes {0, 5, 10, . . . }. Here, in a case where the CSI-RS is activated in the MAC layer in the subframe 3, it is recognized that the CSI-RS is in the radio resource set by the RS setting until the CSI-RS is deactivated in the subframe 3 or later. The terminal apparatus receives the CSI-RS mapped in the fourth subcarrier in the resource block of the fourth OFDM symbol in the subframes 5, 10, . . . , after the reference signal has been activated.

Here, in a case where the reference signal set by the RS setting is activated, the terminal apparatus 1 assumes that the reference signal set by the RS setting has been activated. For example, in a case where the reference signal is a CSI-RS and the CSI-RS is activated in the subframe n, no PDSCH is mapped to the resource elements assumed by the terminal apparatus 1 to be used for the CSI-RS transmission based on the RS setting until the reference signal is deactivated after the subframe n. On the other hand, PDSCH is mapped to a resource element assumed by the terminal apparatus 1 to be used for the CSI-RS based on the potential RS setting either before the subframe n or after the deactivation.

In a case where coordinated communication is performed with a plurality of base station apparatuses 3 or TRPs, the reference signal setting is set individually for each radio link (a plurality of CSI processes, a plurality of CSI measurement settings, or a plurality of RS settings are set for the terminal apparatus 1). The resource elements to which the PDSCH is mapped may be separately signaled. For example, in a case where CSI-RS setting is included in DCI information on the PDSCH resource element mapping, no PDSCH is mapped to the resource element where the CSI-RS transmission is assumed to take place when the RS setting reference signal is activated. Needless to say, the coordinated communication is only an example and is not the only possible communication.

Activation may be performed, based on the RRC setting, when the RRC setting is set and/or when a MAC command is received. For example, if the RS setting of the RRC includes a 'periodic', the corresponding CSI-RS may be activated upon receiving the RRC message.

In a case where the reference signal set by the RS setting is triggered by the DCI, no PDSCH is mapped to the resource element where transmission of the reference signal set by the RS setting is assumed to take place.

A method in which the RS for the CSI reporting is set for the terminal apparatus 1 is set from the base station apparatus 3 will be described below. A corresponding RS setting is identified from the index of the RS settings included in a particular CSI measurement setting, and a channel measurement (channel measurement) can be generated based on the identified RS setting.

In a case where the RS setting transmission method employed in the RS setting and set by the RS setting is a 'periodic' method, a channel measurement is generated based on the RS setting when the RS setting is set.

In a case where the RS setting transmission method employed in the RS setting and set by the RS setting is a 'semi-persistent' method, the terminal apparatus 1 may receive, based on the RS setting, a reference signal set by the RS setting. The terminal apparatus 1 may receive the reference signal from the time when the RS setting is set and the reference signal is activated until the RS setting is deactivated.

Here, activating the reference signal may mean that the terminal apparatus 1 recognizes that a reference signal is mapped to a resource element based on the RS setting. In order to activate the reference signal, the base station apparatus 3 activates the reference signal in the MAC layer for the terminal apparatus 1, and the information for activating the reference signal may be included in the MAC control element or the MAC protocol data unit. The terminal apparatus 3 performs the reception in the MAC layer, and the reception of a reference signal based on the RS setting starts from T (ms) later. In addition, the deactivation, if performed, may be indicated in the MAC layer. As another example of deactivation, instead of instructing the deactivation signaling in the MAC layer, reference signals of resource elements based on the RS setting may be received for a predetermined or pre-set time. Note that the time T described above may be included in the RS setting or may be predefined. In addition, in a case where the time until the reference signal is deactivated in the MAC layer is pre-set, the setting may be included in the RS setting.

At this time, one or more indices of RS settings associated with the reference signal to be activated may be included as the MAC layer information for activating and/or deactivating the reference signal. For example, in a case where one or more RS settings are triggered in MAC layers, which reference signal in the RS settings to be activated may be indicated by a bitmap, or may be collectively encoded. The bit in each field corresponds to an index for each RS setting, and the reference signal corresponding to the field for which one is set is activated. The reference signal corresponding to the field for which zero is set is deactivated.

An index or indices of one or more CSI measurements may be included as the MAC layer information for activating and/or deactivating the reference signal. For example, in a case where one or more CSI measurement settings are triggered by the MAC layers, which CSI measurement in the CSI measurement settings to be activated may be indicated by a bitmap, or may be collectively encoded. The bit in each field corresponds to an index for each CSI measurement, and the CSI measurement corresponding to the field for which one is set is activated. In addition, the CSI measurement corresponding to the field for which zero is set is deactivated.

In a case that the transmission method in the RS setting is a 'semi-persistent' method, the terminal apparatus 1 may be triggered to receive the reference signal by the DCI. At this time, in a subframe that is later than the one indicated by the DCI, the reference signals set by the RS setting may be received based on the RS setting. The terminal apparatus 1 may be instructed, by the DCI, to terminate the reception of the reference signal. In addition, the DCI may include an index of one or more CSI measurements set by the CSI measurement setting. Accordingly, the reference signal reception and CSI measurement can be efficiently performed.

In a case where the transmission method in the RS setting is a 'aperiodic' method, the terminal apparatus 1 may receive a trigger to receive the reference signal by the DCI. At this time, on the basis of the RS setting, the reference signals set by the RS setting may be received once or multiple times in the reference signal resource of the subframe instructed by the DCI or the first reference signal resource after this reference signal resource of the indicated subframe. In addition, the DCI may include an index of one or more set CSI measurements. In addition, as information included in the DCI, which one of the CSI measurement settings to be associated with the triggering may be indicated by a bitmap, or may be collectively encoded.

A method in which the base station apparatus 3 requests the CSI report to the terminal apparatus 1 will be described below. One CSI report setting or the CSI report setting corresponding to the index of the CSI report settings included in the CSI report setting is identified, and then the CSI is reported based on the identified CSI report setting.

In a case where the reporting method in the CSI report setting is a 'periodic' method, the terminal apparatus 1 may periodically report the CSI based on the CSI setting when the CSI report setting is configured.

In a case where the reporting method in the CSI report setting is a 'semi-persistent' method, the terminal apparatus 1 may report the CSI based on the CSI report setting. The terminal apparatus 1 may report the CSI from the time when the CSI report is activated until the CSI report is deactivated.

Here, activating the CSI report may mean that the terminal apparatus 1 may report the CSI based on the CSI report setting. In order to activate the CSI report, the base station apparatus 3 activates the CSI report in the MAC layer for the terminal apparatus 1, and the information to be activated may be included in the MAC control element or MAC protocol data unit. The terminal apparatus 3 performs the reception in the MAC layer, and report of the CSI based on the CSI report setting starts from T (ms) later. In addition, in a case of deactivating the CSI report, it may be instructed by the MAC layer. In addition, before the deactivation, the CSI may be allowed to be reported based on the CSI report setting for a predetermined or a pre-set length of time after the activation of the CSI report. Note that the time T described above may be included in the CSI report setting or may be predefined. In addition, in a case where the time to deactivation in the MAC layer is preset, the setting may be included in the CSI report setting.

At this time, one or more indices of CSI report setting associated with the CSI report to be activated may be included as the MAC layer information for activating and/or deactivating the CSI report.

An index or indices of one or more CSI measurements may be included as the MAC layer information for activating and/or deactivating the CSI report. For example, in a case where one or more CSI measurement settings are triggered by the MAC layers, which one of the CSI measurement settings to be activated may be indicated by a bitmap, or may be collectively encoded. The bit in each field corresponds to an index for each CSI report, and the CSI report corresponding to the field for which one is set is activated. In addition, the CSI report corresponding to the field for which zero is set is deactivated.

In a case that the transmission method in the CSI report setting is a 'semi-persistent' method, the terminal apparatus 1 may be triggered, by the DCI, to report the CSI. At this time, in a subframe that is later than the one indicated by the DCI, CSI may be reported based on the CSI report setting. The terminal apparatus 1 may be instructed to terminate the report of the CSI by the DCI. In addition, the DCI may include an index of one or more CSI measurements set by the CSI measurement setting.

In a case that the transmission method in the CSI report setting is a 'aperiodic', the terminal apparatus 1 may report, by the DCI, the request for CSI. At this time, the CSI may be reported one or multiple times based on CSI report setting in the PUSCH or PUCCH resource for the CSI report in the subframe instructed by the DCI or the in the PUSCH or PUCCH resource of the subframe after the instructed subframe. In addition, the DCI may include an index of one or more set CSI measurements. In addition, as information included in the DCI, which one of the CSI measurement settings to be associated with the triggering may be indicated by a bitmap, or may be collectively encoded. This makes it possible to efficiently perform the CSI measurement and the CSI reporting.

An exemplar relationship with the CSI process will now be described. One or more CSI processes may be set for the terminal apparatus 3. Typically, in a case of coordinated communication (Coordinated Multi-Point: CoMP) among multiple base station apparatuses 3, the CSI processing ID may be used as an identity for CSI measurement and CSI reporting for a radio link with each of the plurality of base station apparatuses 3. However, the present invention is not limited to coordinated communication with the plurality of base station apparatuses 3.

One CSI process may be associated with one CSI measurement setting. A plurality of CSI measurement settings may also be associated with one CSI process. The CSI-RS resource setting and the CSI process may also be associated with each other. The IM setting and the CSI process may also be associated with each other. Alternatively, the "CSI measurement setting" may be referred to as the "CSI process".

In the following, a specific example of the above description is provided. Suppose a case where three CSI report settings (CSI report settings C1, C2, and C3) are set as the CSI report setting, and two RS settings (RS settings R1 and R2) are set. Here, the CSI report settings C1, C2, and C3, and the RS settings R1 and R2 are set as described below.

CSI report setting C1:
  Operation in the time direction: semi-persistent
  Granularity in the frequency domain: wide band
  CSI type: CQI
CSI report setting C2:
  Operation in the time direction: aperiodic
  Granularity in the frequency domain: wide band
  CSI type: RI, CQI
CSI report setting C3:
  Operation in the time direction: aperiodic
  Frequency domain granularity: sub-band (4 resource blocks)
  CSI type: RI, CQI, PMI, and CRI
RS setting R1:
  Operation in the time direction: semi-persistent
  Resource: CSI-RS setting #1
  Reference signal type: CSI-RS
RS setting R2:
  Operation in the time direction: aperiodic
  Resource: CSI-RS setting #2
  Reference signal type: CSI-RS Here, three CSI measurement settings (M1, M2, and M3) are set, and each CSI measurement setting includes the CSI report setting, the RS setting, and the reference transmission mode listed below.

CSI measurement setting M1:
  CSI report setting C1
  RS setting R1
  Reference transmission mode: transmission diversity
CSI measurement setting M2:
  CSI report setting C2
  RS setting R1
  Reference transmission mode: open-loop MIMO
CSI measurement setting M3:
  CSI report setting C3
  RS setting R2
  Reference transmission mode: closed-loop MIMO Here, in a case where the CSI report corresponding to the CSI measurement settings M1 and M2 is performed, the base station apparatus 3 requests the CSI measurements and CSI reports corresponding to the CSI measurement settings M1 and M2 by use of the MAC CE or the MAC PDU of the MAC layer or by use of the DCI in the physical layer. In addition, the terminal apparatus 1 performs the CSI measurements corresponding to the CSI measurement settings M1 and M2, and performs the CSI reporting.

For example, the RS setting R1 of the CSI measurement setting M1 activates the semi-persistent transmission in the MAC layer. At this time, the base station apparatus 3 includes an index associated with the settings R1 and/or M1 in the information whose activation is instructed. The terminal apparatus 1 recognizes, based on the index, the time and/or the frequency of the CSI-RS setting #1, and/or recognizes, based on the code (orthogonal code, m series, cyclic shift, etc.), the CSI-RS resources. In addition, the terminal apparatus 1 measures the CSI until the deactivation.

The base station apparatus 3 requests the reporting of the CSI report setting C1 to the terminal apparatus 1 in order to perform the CSI measurement and the CSI reporting corresponding to the CSI measurement setting M1. Because in the time domain, the operation of the CSI report setting C1 is semi-persistent, the CSI reporting is activated by the MAC layer of the base station apparatus 3. The terminal apparatus 1 reports the CSI by use of the resources for CSI reporting until the deactivation.

At the time of the CSI reporting, the terminal apparatus 1 may report, along with the CSI, the index associated with the CSI and the CSI measurement setting M1 and/or CSI report setting C1. This index may be defined as one of the CSI.

Similarly, also for the CSI measurement setting M2, the base station apparatus 3 may activate the reference signal for the RS setting R1 to perform CSI measurements. To the CSI report, the CSI report setting C2 is related. At this time, because the time direction operation of the CSI report setting C2 is aperiodic, the CSI report by means of the DCI is requested and the terminal apparatus 1 reports the CSI with the resource for the CSI reporting in a case where the terminal apparatus 1 receives, from the base station apparatus 3, the request for the CSI report via the DCI. At this time, the resource for the CSI reporting may be a PUSCH resource scheduled by the base station apparatus 3.

At the time of the CSI reporting, the terminal apparatus 1 may report, along with the CSI, the index associated with the CSI and the CSI measurement setting M2 or CSI report setting C2. This index may be defined as one of the CSI.

Note that, in a case where a plurality of CSI measurement settings are set for the terminal apparatus 1, one or more reference signals may be activated and/or deactivated with information supposed to instruct the activation of one reference signal that is based on the RS setting to be activated and/or deactivated in the MAC layer.

Note that, in a case where a plurality of CSI measurement settings are set for the terminal apparatus 1, one or more CSI reports may be activated and/or deactivated with information supposed to instruct the activation of one CSI report that is based on the CSI report setting to be activated and/or deactivated in the MAC layer.

Note that in a case where a plurality of CSI measurement settings are configured for the terminal apparatus 1 and where a reference signal whose transmission is to be triggered in the physical layer, the reference signals associated with one or more RS settings may be transmitted by one DCI.

Note that in a case where a plurality of CSI measurement settings are configured for the terminal apparatus 1 and where a CSI report whose transmission is to be triggered in the physical layer, CSI reports related to one or more CSI report settings may be requested by one DCI.

An Interference Measurement (IM) resource indicates a resource for measuring interference in the case of a downlink. To this end, the base station apparatus 3 sets one or more IM settings for the terminal apparatus 1. The interference resource setting may include the following settings:
  Operation in the time direction (transmission method)
  Reference signal type The operation in the time direction may indicate a method of transmitting reference signals, such as an aperiodic method, a semi-persistent method, and a periodic method.

The resource may indicate a resource element and/or an OFDM symbol, which is supposed to be a resource for interference measurement in time and/or frequency. In addition, in the case of a semi-persistent or periodic transmission, a period or a CSI-IM transmission interval (e.g., in milliseconds, in numbers of slots, in numbers of OFDM symbols, or the like) may be indicated. Note that the CSI-IM resource may be indicated by an index (or identity) in which such information is mapped.

Note that in any of the periodic, the semi-persistent, or the periodic method, the period and the subframe offset and/or the slot offset of the reference signal to be potentially transmitted may be included in an item within the IM settings described above.

The reference signal type may indicate, for example, whether a resource for interference measurement other than CSI-IM (e.g., NZP CI-RS resource) is to be used as a reference signal for CSI measurement. Needless to say, in a case where the CSI-IM is the only resource that can be used as a resource for interference measurement, this setting does not have to be included.

The IM Settings may be included in the RS settings, or may be defined separately from the RS settings. The interference resource setting may be included in the CSI measurement setting as described below:
One CSI report setting (one setting or an index indicating that one setting among one or more CSI reporting settings);
One RS setting (one setting or an index indicating that one setting among one or more RS settings); and
One IM setting (one setting or an index indicating that one setting among one or more IM settings); and
Reference transmission mode.

In this case, the activation of the reception of the reference signal based on the RS setting and/or the activation of the interference resource based on the IM setting may be performed in different subframes or slots, or may be performed in the same subframe or slot in one piece of information.

The CSI report setting and the RS setting may be set in the RRC (higher layer), or may be defined in advance in the specifications.

In addition to the examples described above, further examples will be described below.

Now suppose that two CSI report settings C1 and C2 and one RS setting R1 are set and are associated with the CSI measurement settings M1 and M2. A combination of the settings C1 and R1 is associated with the CSI measurement setting M1, and a combination of the settings C2 and R1 is associated with the CSI measurement setting M2.

In a case where the reference signal for the RS setting R1 is activated in the subframe n, the terminal apparatus 1 recognizes, based on the RS setting R1, that the reference signal has been transmitted. At this time, the CSI report has not yet been activated or triggered by the CSI report setting. In a case where the CSI report setting C1 is triggered by the DCI in the subframe n+X (X is a positive integer equal to or greater than zero), the CSI measurement and the CSI reporting are performed based on the CSI measurement setting M1 and the CSI report setting C1 by estimating the CSI measurement setting M1 from the combination of the RS setting R1 and the CSI report setting C1. In this case, activation of the CSI measurement does not have to be defined.

In this manner, the terminal apparatus 1 may perform the channel measurement and the CSI reporting based on the channel measurement settings associated with the case where the reference signal associated with the RS setting is activated and triggered and where in addition, the CSI setting is activated or triggered.

As another example, in a case where the CSI reporting associated with the CSI report setting M1 is activated in the subframe n, the terminal apparatus 1 recognizes that the CSI report can be performed based on the CSI report setting C1. At this time, the RS has not yet been activated or triggered by the RS setting. In a case where the reference signal associated with the RS setting R1 is activated in the subframe n+X (X is a positive integer equal to or greater than zero), the CSI measurement and the CSI reporting are performed based on the CSI measurement setting M1 and the CSI report setting C1 by estimating the CSI measurement setting M1 from the combination of the RS setting R1 and the CSI report setting C1. In this case, activation of the CSI measurement does not have to be defined.

In this manner, the terminal apparatus 1 may perform the channel measurement and the CSI reporting based on the channel measurement settings associated with the case where the reference signal associated with the RS setting is activated and triggered and where in addition, the CSI setting is activated or triggered.

As another example, in a case where the CSI reporting associated with the CSI report setting M1 is activated in the subframe n, the terminal apparatus 1 recognizes that the CSI measurement can be performed based on the CSI measurement setting M1. At this time, a reference signal based on the CSI report setting C1 and the RS setting R1, both of which are associated with the CSI measurement setting M1, is activated. The terminal apparatus 1 performs the CSI measurement and the CSI reporting based on these settings. In this case, neither the activation of the reference signal based on the RS setting R1 nor the activation of the CSI report based on the CSI report setting C1 has to be defined.

In this example, suppose a case where the operation of the RS setting R1 in the time domain is the 'semi-persistent', and where the CSI report setting is 'aperiodic'. In this case, a method may be applied where a reference signal based on the RS setting R1 is activated when the CSI measurement based on the CSI measurement setting M1 is activated, and where the terminal apparatus 1 receives a trigger requesting the CSI reporting by DCI while the CSI measurement is being activated.

One aspect of the present embodiment may be operated in carrier aggregation or dual connectivity with Radio Access Technologies (RAT), such as LTE and LTE-A/LTE-A Pro. At this time, the aspect of the present embodiment may be used in some or all cells or cell groups, carriers or carrier groups (e.g., Primary Cell (PCell), Secondary Cell (SCell), Primary Secondary Cell (PSCell), Master Cell Group (MCG), Secondary Cell Group (SCG), etc.). In addition, the aspect of the present embodiment may be used in a stand-alone manner by being operated singularly.

Configurations of apparatuses according to the present embodiment will be described below. The example described below is based on a case where CP-OFDM is used as a downlink radio transmission scheme and CP DFTS-OFDM (SC-FDM) is used as an uplink radio transmission scheme.

Figure 6:
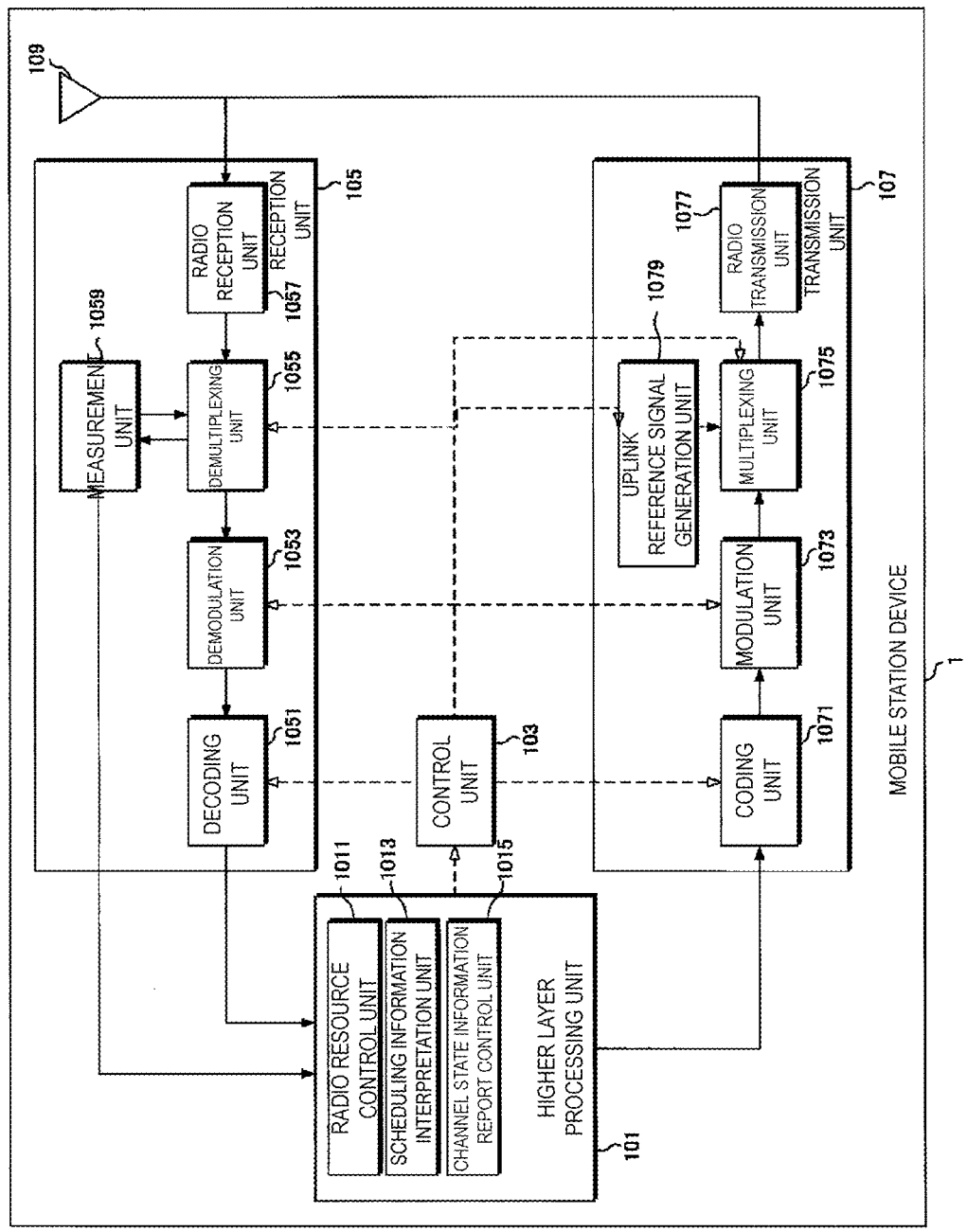
FIG. 6 is a schematic block diagram illustrating a configuration of a terminal apparatus 1 according to the present embodiment.

FIG. 6 is a schematic block diagram illustrating a configuration of the terminal apparatus 1 according to the present embodiment. As illustrated in FIG. 9, the terminal apparatus 1 is configured to include a higher layer processing unit 101, a control unit 103, a reception unit 105, a transmission unit 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. In addition, the higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal apparatus 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI (scheduling information) received through the reception unit 105. Based on the result of interpreting the DCI, the scheduling information interpretation unit 1013 generates control information for control of the reception unit 105 and the transmission unit 107, and outputs the generated control information to the control unit 103.

The CSI report control unit 1015 instructs the measurement unit 1059 to derive Channel State Information (RI/PMI/CQI/CRI) relating to the CSI reference resource. The CSI report control unit 1015 instructs the transmission unit 107 to transmit RI/PMI/CQI/CRI. The CSI report control unit 1015 sets a configuration that is used when the measurement unit 1059 calculates CQI.

Based on the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and/or receive antenna 109, and outputs the resulting, decoded information to the higher layer processing unit 101.

The radio reception unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into a downlink PCCH and a downlink PSCH as well as into a downlink reference signal. Furthermore, the demultiplexing unit 1055 makes a compensation of channels of PCCH and PSCH based on the channel estimate input from the measurement unit 1059. Furthermore, the demultiplexing unit 1055 outputs the downlink reference signal resulting from the demultiplexing, to the measurement unit 1059.

The demodulation unit 1053 demodulates the downlink PCCH, and outputs the resultant PCCH to the decoding unit 1051. The decoding unit 1051 attempts to decode the PCCH. In a case of succeeding in the decoding, the decoding unit 1051 outputs, to the higher layer processing unit 101, the resultant decoded downlink control information and an RNTI to which the downlink control information corresponds.

The demodulation unit 1053 demodulates the PSCH in compliance with a modulation scheme notified of with the downlink grant, such as Quadrature Phase Shift Keying (QPSK), 16 Quadrature Amplitude Modulation (QAM), 64 QAM, and 256 QAM. The demodulation unit 1053 then outputs the resultant, demodulated PSCH to the decoding unit 1051. The decoding unit 1051 decodes the data in accordance with information on a transmission or coding rate notified of with the downlink control information, and outputs, to the higher layer processing unit 101, the resultant, decoded downlink data (the transport block).

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103; codes and modulates the uplink data (the transport block) input from the higher layer processing unit 101; multiplexes PUCCH, PUSCH, and the generated uplink reference signal; and transmits a result of the multiplexing to the base station apparatus 3 through the transmit and/or receive antenna 109.

The coding unit 1071 performs coding on the Uplink Control Information and the uplink data input from the higher layer processing unit 101. The modulation unit 1073 modulates the coded bits input from the coding unit 1071, in compliance with the modulation scheme such as BPSK, QPSK, 16 QAM, 64 QAM, and 256 QAM.

The uplink reference signal generation unit 1079 generates a sequence acquired according to a rule (formula) prescribed in advance, based on a physical cell identifier (also referred to as a Physical Cell Identity (PCI), a cell ID, or the like) for identifying the base station apparatus 3, a bandwidth to which the uplink reference signal is mapped, a cyclic shift notified with the uplink grant, a parameter value for generation of a DMRS sequence, and the like.

On the basis of the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of PSCH. Furthermore, the multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDM scheme, attaches the Guard Interval to the SC-FDM-modulated SC-FDM symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 7:
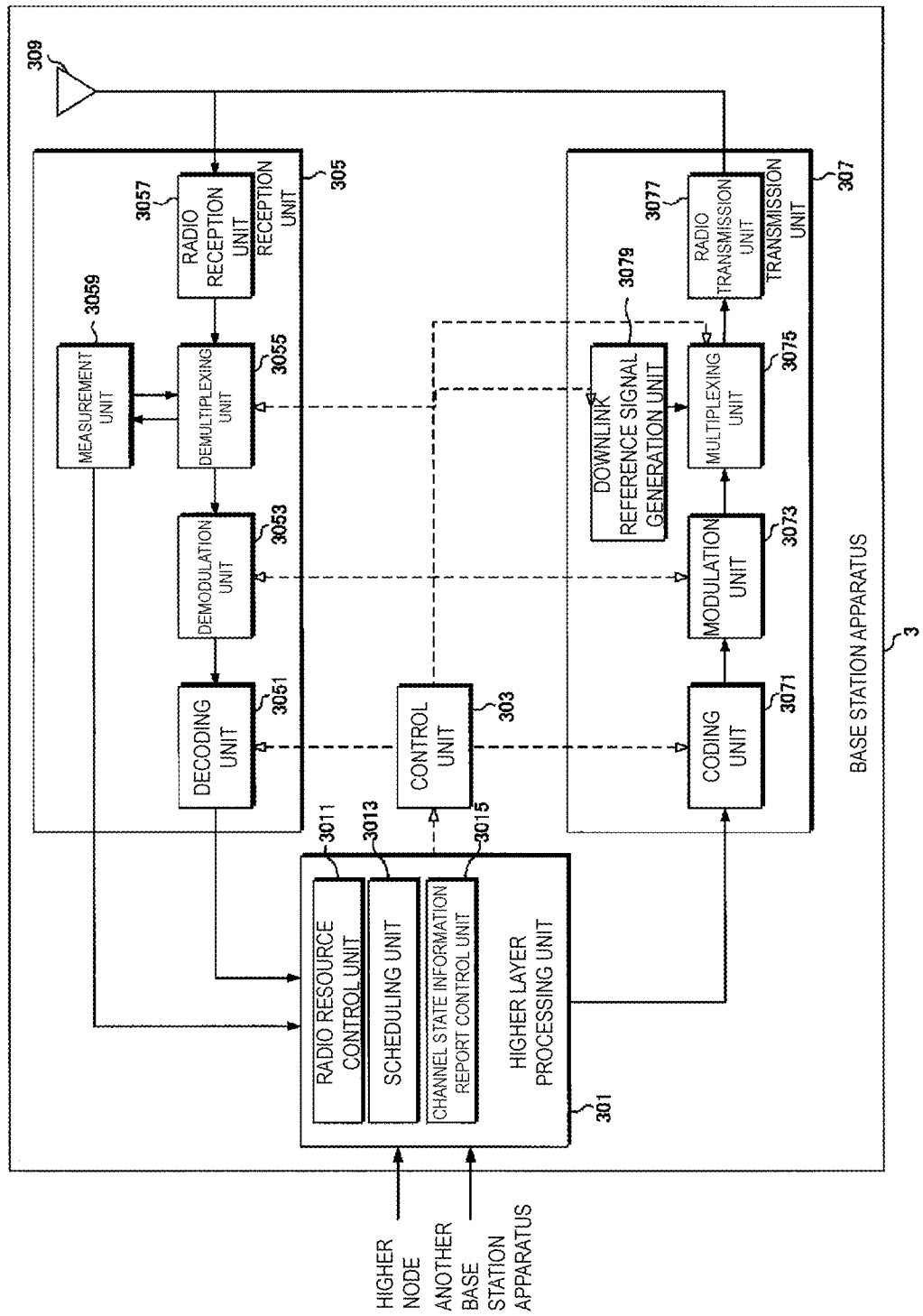
FIG. 7 is a schematic block diagram illustrating a configuration of a base station apparatus 3 according to the present embodiment.

FIG. 7 is a schematic block diagram illustrating a configuration of the base station apparatus 3 according to the present embodiment. As illustrated in FIG. 7, the base station apparatus 3 includes a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a CSI report control unit 3015. The reception unit 305 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

In addition, the higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PSCH, system information, the RRC message, the MAC Control Element (CE), and the like, and outputs a result of the generation or the acquirement to the transmission unit 307. Furthermore, the radio resource control unit 3011 manages various configuration information for each of the terminal apparatuses 1.

The scheduling unit 3013 included in the higher layer processing unit 301 determines a frequency and a subframe to which the physical channels (PSCHs) are allocated, the transmission coding rate and modulation scheme for the physical channels (PSCHs), the transmit power, and the like, from the received CSI and from the channel estimate, channel quality, or the like input from the measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates the information (e.g., the DCI (format)) to be used for the scheduling of the physical channels (PSCHs), based on the result of the scheduling.

The CSI report control unit 3015 included in the higher layer processing unit 301 controls a CSI report that is made by the terminal apparatus 1. The CSI report control unit 3015 transmits information that is assumed in order for the terminal apparatus 1 to derive RI/PMI/CQI in the CSI reference resource and that shows various configurations, to the terminal apparatus 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio reception unit 3057 into PCCH, PSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including PCCH and PSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on PSCH, acquires modulation symbols, and performs reception signal demodulation, that is, demodulates each of the modulation symbols on PCCH and PSCH, in compliance with the modulation scheme prescribed in advance, such as Binary Phase Shift Keying (BPSK), QPSK, 16 QAM, 64 QAM, and 256 QAM, or in compliance with the modulation scheme that the base station apparatus 3 itself notifies in advance each of the terminal apparatuses 1 with the uplink grant. The demodulation unit 3053 demultiplexes the modulation symbols of multiple pieces of uplink data transmitted on the same PSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of PCCH and PSCH, which have been demodulated, at the coding rate in compliance with a coding scheme prescribed in advance, the transmission or original coding rate being prescribed in advance or being notified of in advance with the uplink grant to the terminal apparatus 1 by the base station apparatus 3 itself, and outputs the decoded uplink data and uplink control information to the higher layer processing unit 101. In a case where the PSCH is re-transmitted, the decoding unit 3051 performs the decoding with the coded bits input from the higher layer processing unit 301 and retained in an HARQ buffer, and the demodulated coded bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303; codes and modulates the Downlink Control Information, and the downlink data that are input from the higher layer processing unit 301; multiplexes PCCH, PSCH, and the downlink reference signal; and transmits a result of the multiplexing to the terminal apparatus 1 through the transmit and/or receive antenna 309.

The coding unit 3071 performs coding on the Downlink Control Information and the downlink data input from the higher layer processing unit 301. The modulation unit 3073 modulates the coded bits input from the coding unit 3071, in compliance with the modulation scheme such as BPSK, QPSK, 16 QAM, 64 QAM, and 256 QAM.

The downlink reference signal generation unit 3079 generates, as the downlink reference signal, a sequence that is already known to the terminal apparatus 1 and that is acquired in accordance with a rule prescribed in advance based on the physical cell identity (PCI) for identifying the base station apparatus 3, or the like.

The multiplexing unit 3075, in accordance with the number of PSCH layers to be spatial-multiplexed, maps one or multiple pieces of downlink data to be transmitted on one PSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

(1) Specifically, a terminal apparatus 1 according to a first aspect of the present invention is a terminal apparatus for communicating with a base station apparatus. The terminal apparatus includes: a reception unit configured to receive first information including a setting for a reference signal for measuring channel state information, receive second information including information for activating the reference signal, and receive a physical downlink shared channel; and a transmission unit configured to report the channel state information. In the terminal apparatus, in a case where the reference signal is activated, the downlink shared channel is not mapped to a resource element for the reference signal activated. In a case where the reference signal is not activated, the downlink shared channel is mapped to a resource element for the reference signal.

(2) A base station apparatus 3 according to a second aspect of the present invention is a base station apparatus for communicating with a terminal apparatus. The base station apparatus includes: a transmission unit configured to transmit first information including a setting for a reference signal for measuring channel state information, transmit second information for activating the reference signal, and transmit a physical downlink shared channel; and a reception unit configured to receive the channel state information. In the base station apparatus, in a case where the reference signal is activated, the downlink shared channel is not mapped to a resource element for the reference signal activated. In a case where the reference signal is not activated, the downlink shared channel is mapped to a resource element for the reference signal.

(3) A communication method according to a third aspect of the present invention is a communication method for a terminal apparatus for communicating with a base station apparatus. The communication method includes the steps of: receiving first information including a setting for a reference signal for measuring channel state information; receiving second information including information for activating the reference signal; receiving a physical downlink shared channel; and reporting channel state information. In the communication method, in a case where the reference signal is activated, the downlink shared channel is not mapped to a resource element for the reference signal activated. In a case where the reference signal is not activated, the downlink shared channel is mapped to a resource element for the reference signal.

(4) A communication method according to a fourth aspect of the present invention is a communication method for a base station apparatus for communicating with a terminal apparatus. The communication method includes the steps of: transmitting first information including a setting for a reference signal for measuring channel state information; transmitting second information including information for activating the reference signal; transmitting a physical downlink shared channel; and receiving the channel state information. In the communication method, in a case where the reference signal is activated, the downlink shared channel is not mapped to a resource element for the reference signal activated. In a case where the reference signal is not inactivated, the downlink shared channel is mapped to a resource element for the reference signal.

(5) An integrated circuit according to a fifth aspect of the present invention is an integrated circuit to be mounted in a terminal apparatus for communicating with a base station apparatus. The integrated circuit includes: a receiver configured to receive first information including a setting for a reference signal for measuring channel state information, receive second information including information for activating the reference signal, and receive a physical downlink shared channel; and a transmitter configured to report the channel state information. In the integrated circuit, in a case where the reference signal is activated, the downlink shared channel is not mapped to a resource element for the reference signal activated. In a case where the reference signal is not activated, the downlink shared channel is mapped to the resource element for the reference signal.

(6) An integrated circuit according to a sixth aspect of the present invention is an integrated circuit to be mounted in a base station apparatus for communicating with a terminal apparatus. The integrated circuit includes: a transmitter configured to transmit first information including a setting for a reference signal for measuring channel state information, transmit second information including information for activating the reference signal, and transmit a physical downlink shared channel; and a receiver configured to receive the channel state information. In the integrated circuit, in a case where the reference signal is activated by the second information, the downlink shared channel is not mapped to a resource element for the reference signal activated. In a case where the reference signal is not activated, the downlink shared channel is mapped to the resource element for the reference signal.

(A1) A terminal apparatus according to one aspect of the present invention is a terminal apparatus for communicating with a base station apparatus. The terminal apparatus includes: a higher layer processing unit configured to receive first information including a setting for semi-persistent channel state information-reference signal (CSI-RS) for measuring channel state information; a medium access control (MAC) layer configured to receive second information including information for activating the semi-persistent CSI-RS; and a reception unit configured to receive a physical downlink shared channel (PDSCH). In the terminal apparatus, in a case where the semi-persistent CSI-RS is activated, a resource element to be used for the reference signal activated is not to be used as a resource element for the physical downlink shared channel.

(A2) A base station apparatus according to one aspect of the present invention is a base station apparatus for communicating with a terminal apparatus. The base station apparatus includes: a higher layer processing unit configured to transmit first information including a setting for semi-persistent channel state information-reference signal (CSI-RS) for measuring channel state information; a medium access control (MAC) layer configured to transmit second information including information for activating the semi-persistent CSI-RS; and a transmission unit configured to transmit a physical downlink shared channel (PDSCH). In the base station apparatus, in a case where the semi-persistent CSI-RS is activated, a resource element to be used for the semi-persistent CSI-RS activated is not to be used as a resource element for the physical downlink shared channel.

(A3) A communication method according to one aspect of the present invention is a communication method for a terminal apparatus for communicating with a base station apparatus. The communication method includes the steps of: receiving first information including a setting for semi-persistent channel state information-reference signal (CSI-RS) for measuring channel state information; receiving second information including information for activating the semi-persistent CSI-RS; and receiving a physical downlink shared channel (PDSCH). In the communication method, in a case where the semi-persistent CSI-RS is activated, a resource element to be used for the reference signal activated is not to be used as a resource element for the physical downlink shared channel.

(A4) A communication method according to one aspect of the present invention is a communication method for a base station apparatus for communicating with a terminal apparatus. The communication method includes the steps of: transmitting first information including a setting for semi-persistent channel state information-reference signal (CSI-RS) for measuring channel state information; transmitting second information including information for activating the semi-persistent CSI-RS; and transmitting a physical downlink shared channel (PDSCH). In the communication method, in a case where the semi-persistent CSI-RS is activated, a resource element to be used for the reference signal activated is not to be used as a resource element for the physical downlink shared channel.

(A5) An integrated circuit according to one aspect of the present invention is an integrated circuit to be mounted in a terminal apparatus for communicating with a base station apparatus. The integrated circuit includes a receiver configured to: receive first information including a setting for semi-persistent channel state information-reference signal (CSI-RS) for measuring channel state information; receive second information including information for activating the semi-persistent CSI-RS; and receive a physical downlink shared channel (PDSCH). In the integrated circuit, in a case where the semi-persistent CSI-RS is activated, a resource element to be used for the reference signal activated is not to be used as a resource element for the physical downlink shared channel.

(A6) An integrated circuit according to one aspect of the present invention is an integrated circuit to be mounted in a base station apparatus for communicating with a terminal apparatus. The integrated circuit includes a transmitter configured to: transmit first information including a setting for semi-persistent channel state information-reference signal (CSI-RS) for measuring channel state information; transmit second information including information for activating the semi-persistent CSI-RS; and transmit a physical downlink shared channel (PDSCH). In the integrated circuit, in a case where the semi-persistent CSI-RS is activated, a resource element to be used for the reference signal activated is not to be used as a resource element for the physical downlink shared channel.

A program running on an apparatus according to one aspect of the present invention may serve as a program that controls a Central Processing Unit (CPU) and the like to cause a computer to operate in such a manner as to realize the functions of the embodiment according to one aspect of the present invention. Programs or the information handled by the programs are temporarily stored in a volatile memory, such as a Random Access Memory (RAM), in a non-volatile memory, such as a flash memory, in a Hard Disk Drive (HDD), or in any of other storage apparatus systems.

Note that a program for realizing the functions of the embodiment according to one aspect of the present invention may be recorded in a computer-readable recording medium. The functions may be realized by loading, into a computer system, a program recorded on the recording medium, and then causing the computer system to execute the loaded program. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium configured to hold a program dynamically for a short time, or other computer-readable recording media.

Furthermore, each functional block or various characteristics of the apparatuses used in the above-described embodiment may be implemented or performed on an electric circuit, such as an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor. Alternatively, the processor may be a processor of known type, a controller, a micro-controller, or a state machine. The above-mentioned electric circuit may include a digital circuit, or may include an analog circuit. In addition, in a case where with advances in semiconductor technology, a circuit integration technology appears that replaces the present integrated circuits, it is also possible for one or more aspects of the present invention to use a new integrated circuit based on the advanced technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 TXRU
11 Phase shifter
12 Antenna
101 Higher layer processing unit
103 Control unit
105 Reception unit
107 Transmission unit
109 Antenna
301 Higher layer processing unit
303 Control unit
305 Reception unit
307 Transmission unit
1013 Scheduling information interpretation unit
1015 Channel State Information report control unit
1051 Decoding unit
1053 Decoding unit
1055 Demultiplexing unit
1057 Radio reception unit
1059 Measurement unit
1071 Coding unit
1073 Modulation unit
1075 Multiplexing unit
1077 Radio transmission unit
1079 Uplink reference signal generation unit
3011 Radio resource control unit
3013 Scheduling unit
3015 Channel State Information report control unit
3051 Decoding unit
3053 Decoding unit
3055 Demultiplexing unit
3057 Radio reception unit
3059 Measurement unit
3071 Coding unit
3073 Modulation unit
3075 Multiplexing unit
3077 Radio transmission unit
3079 Downlink reference signal generation unit

The invention claimed is:

1. A terminal device comprising:
higher layer processing circuitry configured to:
receive a configuration of a resource for a channel state information-reference signal (CSI-RS),
receive a configuration indicating semi-persistent transmission of the CSI-RS,
receive a configuration of a channel state information-interference measurement (CSI-IM) resource, and
receive a first medium access control (MAC) control element (CE) and a second MAC CE,
wherein the first and second MAC CEs include information indicating whether to activate the CSI-RS and whether to activate the CSI-IM resource;
reception circuitry configured to:
receive a physical downlink shared channel (PDSCH),
receive the first MAC CE in a first slot, and
receive the second MAC CE in a second slot; and
measurement circuitry configured to:
measure channel state information (CSI) based on the CSI-RS,
wherein:
the CSI-RS is activated by the first MAC CE,
the PDSCH is not mapped on the resource for the CSI-RS, and
the CSI-IM resource is activated by the second MAC CE.

2. A base station device comprising:
higher layer processing circuitry configured to:
transmit a configuration of a resource for a channel state information-reference signal (CSI-RS),
transmit a configuration indicating semi-persistent transmission of the CSI-RS,
transmit a configuration of a channel state information-interference measurement (CSI-IM) resource, and transmit a first medium access control (MAC) control element (CE) and a second MAC CE,
wherein the first and second MAC CEs include information indicating whether to activate the CSI-RS and whether to activate the CSI-IM resource;
transmission circuitry configured to:
receive a physical downlink shared channel (PDSCH),
transmit the first MAC CE in a first slot, and
transmit the second MAC CE in a second slot; and
reception circuitry configured to:
receive channel state information (CSI) which is based on the CSI-RS,
wherein:
the CSI-RS is activated by the first MAC CE,
the PDSCH is not mapped on the resource for the CSI-RS, and
the CSI-IM resource is activated by the second MAC CE.

3. A communication method for a terminal device, the communication method comprising:
receiving a configuration of a resource for a channel state information-reference signal (CSI-RS);
receiving a configuration indicating semi-persistent transmission of the CSI-RS;
receiving a configuration of a channel state information-interference measurement (CSI-IM) resource;
receiving a first medium access control (MAC) control element (CE) in a first slot and a second MAC CE in a second slot,
wherein the first and second MAC CEs include information indicating whether to activate the CSI-RS and whether to activate the CSI-IM resource;
receiving a physical downlink shared channel (PDSCH); and
measuring channel state information (CSI) based on the CSI-RS,
wherein:
the CSI-RS is activated by the first MAC CE,
the PDSCH is not mapped on the resource for the CSI-RS, and
the CSI-IM resource is activated by the second MAC CE.

4. A communication method for a base station device, the communication method comprising:
transmitting a configuration of a resource for a channel state information-reference signal (CSI-RS);
transmitting a configuration indicating semi-persistent transmission of the CSI-RS;
transmitting a configuration of a channel state information-interference measurement (CSI-IM) resource;
transmitting a first medium access control (MAC) control element (CE) in a first slot and a second MAC CE in a second slot,
wherein the first and second MAC CEs include information indicating whether to activate the CSI-RS and whether to activate the CSI-IM resource;
transmitting a physical downlink shared channel (PDSCH); and
receiving channel state information (CSI) which is based on the CSI-RS,
wherein:
the CSI-RS is activated by the first MAC CE,
the PDSCH is not mapped on the resource for the CSI-RS, and
the CSI-IM resource is activated by the second MAC CE.

* * * * *